(12) United States Patent
Park et al.

(10) Patent No.: US 9,071,411 B2
(45) Date of Patent: Jun. 30, 2015

(54) CONTROL CHANNEL ELEMENT DETECTION METHOD USING CQI IN A WIRELESS COMMUNICATION SYSTEM

(75) Inventors: Hee Young Park, Seoul (KR); Seong Wook Song, Gwacheon-si (KR); Hun Kee Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 408 days.

(21) Appl. No.: 12/637,361

(22) Filed: Dec. 14, 2009

(65) Prior Publication Data

US 2010/0150090 A1  Jun. 17, 2010

(30) Foreign Application Priority Data

Dec. 12, 2008 (KR) .................. 10-2008-0126470

(51) Int. Cl.
| | |
|---|---|
| H04W 4/00 | (2009.01) |
| H04L 5/00 | (2006.01) |
| H04L 1/00 | (2006.01) |
| H04W 72/14 | (2009.01) |

(52) U.S. Cl.
CPC ............ *H04L 5/0091* (2013.01); *H04L 1/0023* (2013.01); *H04L 1/0046* (2013.01); *H04L 1/0047* (2013.01); *H04L 1/0067* (2013.01); *H04L 5/0007* (2013.01); *H04L 5/0037* (2013.01); *H04L 5/0053* (2013.01); *H04L 5/006* (2013.01); *H04W 72/14* (2013.01); *Y02B 60/50* (2013.01)

(58) Field of Classification Search
CPC ..................................................... H94W 72/00

USPC ......... 370/311, 252–253, 278–281, 310, 342, 370/328–338, 506–545
See application file for complete search history.

(56) References Cited

U.S. PATENT DOCUMENTS

| | | | | |
|---|---|---|---|---|
| 7,412,238 | B2 | 8/2008 | Hui et al. | |
| 2008/0268785 | A1* | 10/2008 | McCoy et al. | ............. 455/67.11 |
| 2008/0273479 | A1* | 11/2008 | Kwak et al. | .................... 370/311 |
| 2010/0254272 | A1 | 10/2010 | Chun et al. | |
| 2010/0265862 | A1* | 10/2010 | Choi et al. | .................... 370/311 |
| 2015/0029994 | A1 | 1/2015 | Lee et al. | |

FOREIGN PATENT DOCUMENTS

| | | |
|---|---|---|
| EP | 2 093 953 | 8/2009 |
| EP | 2 096 886 | 9/2009 |

(Continued)

OTHER PUBLICATIONS

Korean Office Action dated May 11, 2015 issued in counterpart application No. 10-2008-0126470.

*Primary Examiner* — Iqbal Zaidi
(74) *Attorney, Agent, or Firm* — The Farrell Law Firm, P.C.

(57) ABSTRACT

A control channel element detection method and apparatus is provided for detecting the Control Channel Elements (CCEs) carrying control information for a mobile station using a Channel Quality Indicator (CQI). A CCE detection method includes searching a current subframe for CCEs, and locating the CCEs carrying control information for the mobile station by decoding the current subframe with variable code rates. Searching for the CCEs includes searching the current subframe for the CCEs carrying the control information for the mobile station while changing a size type of the CCEs according to a result of a comparison between a CQI of the current subframe and a CQI of a previous subframe.

6 Claims, 9 Drawing Sheets

(56) References Cited

FOREIGN PATENT DOCUMENTS

| EP | 2096886 A1 * | 9/2009 |
| KR | 1020020094076 | 12/2002 |
| KR | 1020040050756 | 6/2004 |
| KR | 1020080030942 | 4/2008 |
| KR | 1020090088255 | 8/2009 |
| WO | WO 2008/041819 | 4/2008 |

* cited by examiner

CONTROL CHANNEL ELEMENT DETECTION METHOD USING CQI IN A WIRELESS COMMUNICATION SYSTEM

PRIORITY

This application claims priority to an application filed in the Korean Intellectual Property Office on Dec. 12, 2008 and assigned Serial No. 10-2008-0126470, the content of which is incorporated herein by reference.

BACKGROUND OF THE INVENTION

1. Field of the Invention

The present invention relates generally to wireless communications and, more particularly, to a control channel element detection method and apparatus using a Channel Quality Indicator (CQI) in a wireless communication system.

2. Description of the Related Art

Universal Mobile Telecommunications System (UMTS) is one of the 3rd Generation (3G) mobile telecommunication technologies, which has evolved from Global System for Mobile communications (GSM) and General Packet Radio Services (GPRS), and uses Wideband Code Division Multiple Access (WCDMA). The $3^{rd}$ Generation Partnership Project (3GPP), which is responsible for the standardization of UMTS, is working to significantly extend the performance of UMTS in the work item Long Term Evolution (LTE).

LTE is a 3GPP standard that provides downlink speeds of up to 300 Mbps and is expected to be commercially launched in 2010. In order to fulfill the requirements for the LTE systems, studies are being done on various aspects including minimization of the number of involved nodes in the connections and placing radio protocol as close as to the radio channels.

In an LTE system, a Physical Downlink Control CHannel (PDCCH) carries resource allocation information for a downlink shared channel and an uplink shared channel. A base station (e.g., an evolved Node-B (eNB)) transmits the PDCCH to individual mobile stations (e.g., User Equipments (UE)). PDCCHs are transmitted on one or several Control Channel Elements (CCEs), where a CCE corresponds to 9 Resource Element Groups (REGs).

The PDCCH is located in the first three Orthogonal Frequency Division Multiplexing (OFDM) symbols of each subframe. The resource scheduling information of the PDCCH is mapped from the $0^{th}$ subcarrier of the $0^{th}$ OFDM symbol. The resource scheduling information of the PDCCH includes the resource allocation information such as a number of OFDM symbols, transmission format, and retransmission information. Also, the downlink reference signals are transmitted in the same resource space as the PDSCH. Other downlink control channels are mapped to the remaining resource space, i.e., where the PDCCH resource allocation information and the reference signals are not mapped.

When a base station is serving multiple mobile stations, each mobile station can locate the resources allocated for transmission and/or reception of data, based on the control information included in the PDCCH. The base station maps the control channel elements carrying the PDCCHs for the mobile stations into the resource space in a sequential order. Accordingly, each mobile station searches the entire PDCCH resource space for the PDCCH destined for itself with all the potential CCE formats. Although the CCE search process is simple, the repeated CCE searching steps may cause a processing delay. Consequently, such a processing delay can be burdensome for the power-constrained mobile stations.

SUMMARY OF THE INVENTION

In order to solve at least the above problems of prior arts, the embodiment of the present invention described herein provide a method for detecting a Control Channel Elements (CCEs) based on a Channel Quality Indicator (CQI) in a wireless communication system that is capable of facilitating PDCCH format search, resulting in reduction of PDCCH decoding delay and power consumption.

In accordance with an embodiment of the present invention, a CCE detection method of a mobile station using a CQI in a wireless communication system includes searching a current subframe for CCEs; and locating the CCEs carrying control information for the mobile station by decoding the subframe. Searching for the CCEs includes searching the subframe for the CCEs carrying the control information for the mobile station while changing size type of the CCEs according to a result of comparison between the CQIs of the current subframe and a previous subframe; or locating the CCEs comprises de-rating the current frame while changing a code rate of the CCEs according to a value of the CQI of the current subframe.

In accordance with another embodiment of the present invention, a CCE detection apparatus of a mobile station includes a CCE controller which searches a current subframe for CCEs; a decoder which decodes, when the CCEs are found, the current subframe; and a determiner which determines whether the CCEs carried by the subframe are transmitted for the mobile terminal, based on a result of decoding the current subframe. The CCE controller searches the subframe for the CCEs carrying the control information for the mobile station while changing the size type of the CCEs according to a result of comparison between the CQIs of the current subframe and a previous subframe or the determiner de-rates the current frame while changing a code rate of the CCEs according to a value of the CQI of the current subframe.

BRIEF DESCRIPTION OF THE DRAWINGS

The above and other objects, features, and advantages of the present invention will be more apparent from the following detailed description in conjunction with the accompanying drawings, in which.

DETAILED DESCRIPTION OF EMBODIMENTS OF THE INVENTION

Various embodiments of the present invention will be described in detail herein with reference to the accompanying drawings. The same reference numbers are used throughout the drawings to refer to the same or like parts. Detailed descriptions of well-known functions and structures incorporated herein may be omitted to avoid obscuring the subject matter of the present invention in unnecessary detail.

The terms and words used in the following description and claims are not limited to the dictionary meanings, but are merely used by the inventor to enable a clear and consistent understanding of the invention. Accordingly, it should be apparent to those skilled in the art that the following description of the various embodiments of the present invention are provided for illustration purpose only and not for the purpose of limiting the invention as should be defined by the appended claims and their equivalents.

In the following description, a size type indicates a number of Control Channel Elements (CCEs) used for transmitting a Physical Downlink Control CHannel (PDCCH) and an aggregation level (a number of consecutive CCEs). That is, a PDCCH is transmitted on an aggregation level of 1, 2, 4, or 8 consecutive CCEs according to whether the size type is 0, 1, 2, or 3, respectively.

The size type of CCEs is a number of CCEs for transmitting a PDCCH.

In accordance with an embodiment of the present invention, a first reference Channel Quality Indicator (CQI) is a value with which decoding can be performed correctly by using only the CCEs corresponding to the code rate of a mother code in de-rate matching. The first reference CQI value is obtained through a simulation.

In accordance with an embodiment of the present invention, a second reference CQI is a value with which decoding can be performed correctly by using the CCEs corresponding to a code rate higher than that of the mother code in de-rate matching. The second reference CQI value is also obtained through a simulation.

The following descriptions are made with the terms defined in the 3GPP LTE standard specifications, although the present invention is also applicable to differently named components, which perform similar functions.

Figure 1:
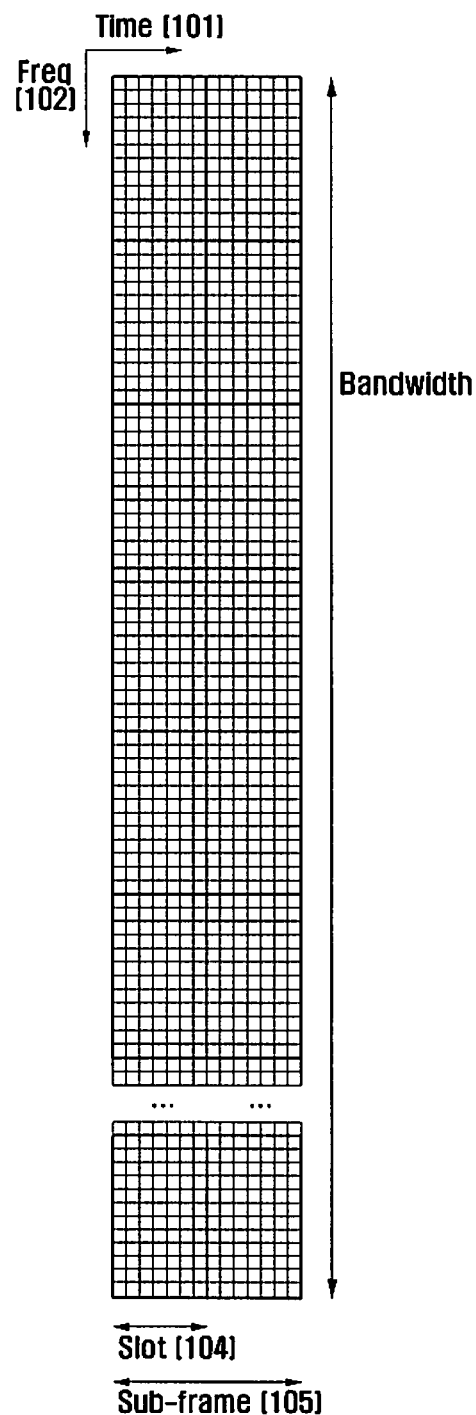
FIG. 1 is a diagram illustrating a resource grid representing transmission resources for use in an LTE system.

FIG. 1 is a diagram illustrating a resource grid representing transmission resources for use in an LTE system. In the LTE system, the transmission resource is expressed in the form of a two dimensional grid of time and frequency axes.

Referring to FIG. 1, the horizontal axis denotes time 101, and the vertical axis denotes frequency 102. In the time domain, a slot 104 includes 7 OFDM symbols, and a subframe 105 includes two slots. Typically, the subframe 105 is equal to a Transmission Time Interval (TTI) in length.

Figure 2:
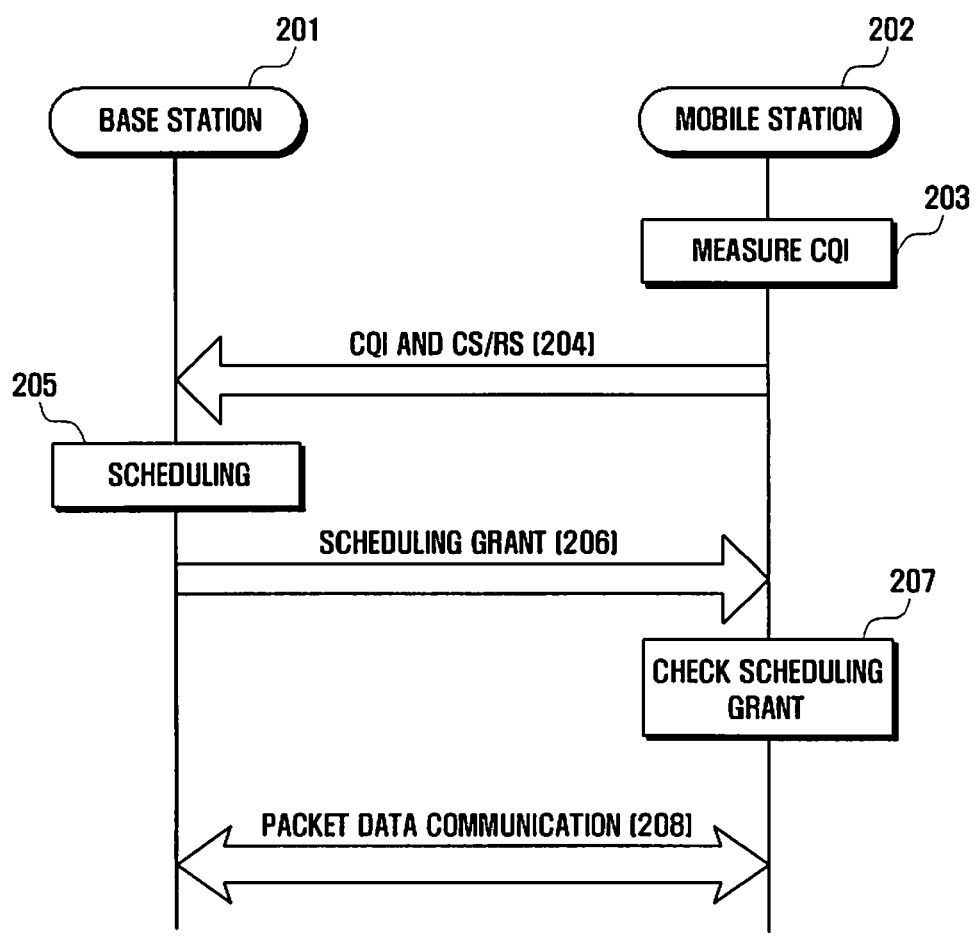
FIG. 2 is a sequence diagram illustrating operations of a base station and a mobile station for communication in an LTE system.

FIG. 2 is a sequence diagram illustrating operations of a base station and a mobile station for communication in an LTE system.

Referring to FIG. 2, in step 203, the mobile station 202 measures a channel condition of a downlink channel based on a Reference Signal (RS) transmitted by the base station 201 and selects a CQI corresponding to the measurement. In step 204, the mobile station 202 sends the CQI to the base station 201 along with a Channel Sounding Reference Signal (CS/RS).

If the CQI and/or CS/RS is received, the base station 201 performs scheduling based on the CQI and/or CS/RS to assign downlink and/or uplink resources to the mobile station 202 in step 205, and sends a Scheduling Grant indicating the downlink and/or uplink resource assigned to the mobile station 202 in step 206.

Upon receipt of the Scheduling Grant, in step 207, the mobile station 202 determines whether the Scheduling Grant is destined for itself. If the Scheduling Grant is destined for the mobile station 202, the mobile station 202 locates the resource assigned for the downlink or uplink transmission and receives or transmits data on the allocated resource in step 208.

The base station 201 sends the mobile station 202 the control information related to data transmission and reception using the scheduling grant. The scheduling grant is transmitted on the PDCCH. The PDCCH uses some part of the resource as illustrated in FIG. 1.

The base station 201 selects one or more PDCCHs among the available PDCCHs and sends the scheduling grant through the selected PDCCH(s).

The mobile station 202 monitors all the PDCCHs to detect the PDCCH destined for itself because it does not know which PDCCH is being used for the transmission among all the available PDCCHs. Accordingly, when multiple PDCCH are used to transmit the control information, the mobile station 202 performs a large number of decodings for receiving the scheduling grant, thereby increasing reception complexity and unnecessary power consumption of the mobile station.

Figure 3:
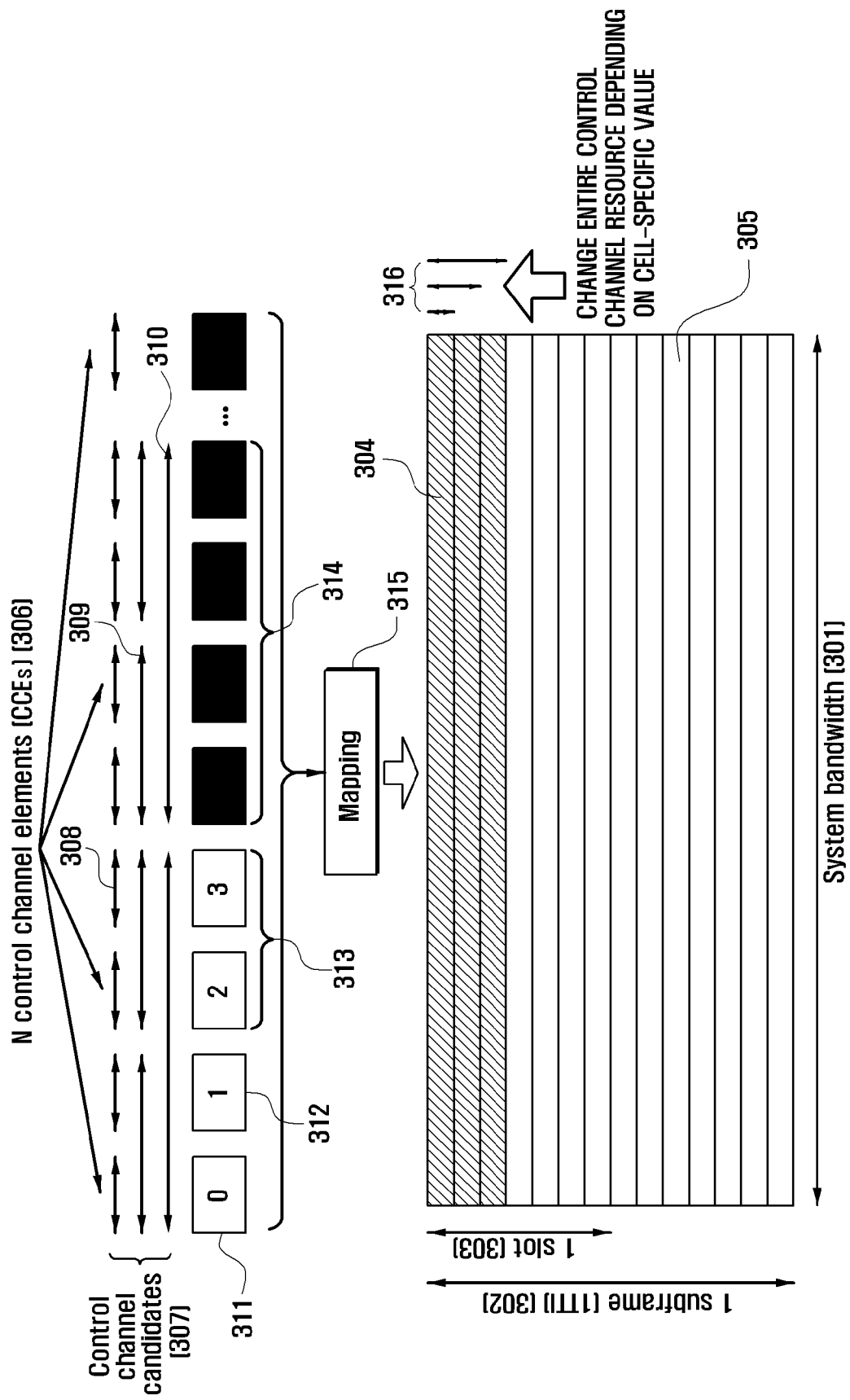
FIG. 3 is a diagram illustrating a principle of control channel-resource mapping for supporting a CQI-based CCE detection method according to an embodiment of the present invention.

FIG. 3 is a diagram illustrating a principle of control channel-resource mapping for supporting a CQI-based CCE detection method according to an embodiment of the present invention.

Referring to FIG. 3, a slot is a minimum unit of resource allocation in the time domain within the system bandwidth. Slot 303 includes, for example, 7 OFDM symbols, and a subframe 302 includes two consecutive slots. The subframe 302 is a minimum unit of resource allocation and is identical with a TTI in length. The PDCCHs are mapped to a control channel region, i.e., the first three OFDM symbols of the subframe, and a Physical Downlink Shared CHannel (PDSCH) for carrying packet data are mapped within the remaining OFDM symbols 305.

In the control channel resource region 304, the PDCCHs for the downlink or uplink transmission are mapped.

A PDCCH is transmitted over one or more CCEs. That is, the control information for the mobile station having a good channel condition is transmitted on a single CCE having a high code rate, and, in contrast, the control information for the mobile station having a bad channel condition is transmitted on multiple CCEs having low code rates. Accordingly, the mobile station having a bad channel condition can reliably receive the control information on the PDCCH.

For example, the PDCCH can be transmitted over 1 (reference numeral 308), 2 (reference numeral 309), 4 (reference numeral 310), or 8 consecutive CCEs with different numbers of control channel candidates in the control channel resource region 304. When the total number of CCEs is N, if the aggregation level is 1, N PDCCH candidates exist; if the aggregation level is 2, [N/2] PDCCH candidates exist; if the aggregation level is 4, [N/4] PDCCH candidates exist; and if the aggregation level is 8, [N/8] PDCCH candidates exist. Here, [A] is the greatest integer that does not exceed A.

More specifically, the PDCCHs denoted by reference numerals 311 and 312 are transmitted over one CCE, respectively, and the PDCCH denoted by reference numeral 313 is transmitted over two CCEs. In the same manner, the PDCCH denoted by reference numeral 314 is transmitted over 4 CCEs. As described above, the PDCCHs 311, 312, 313, and 314 are mapped to the control channel resource region 304.

The control channel resource region 304 to which multiple PDCCHs are mapped uses up to 3 OFDM symbol in a subframe. The number of PDCCHs transmitted simultaneously and the number of required CCEs can be changed depending on the number of mobile stations and the channel condition of each mobile station, and the size of the control channel resource region for the PDCCHs can be changed as denoted by reference numeral 316.

Figure 4:
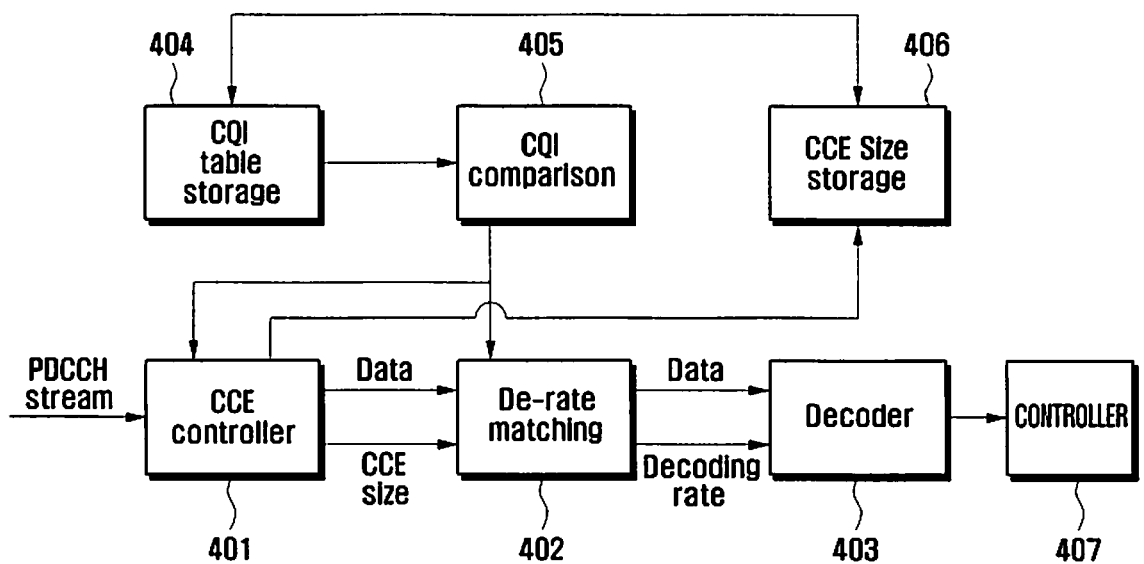
FIG. 4 is a block diagram illustrating a control channel element detection apparatus according to an embodiment of the present invention.

FIG. 4 is a block diagram illustrating a CCE detection apparatus according to an embodiment of the present invention.

As illustrated in FIG. 4, the CCE detection apparatus includes a CCE controller 401, a de-rate matcher 402, a decoder 403, a CQI table storage 404, a CQI comparator 405, a CCE size storage 406, and a controller 407.

The CCE controller 401 monitors for CCEs in a current subframe and, if any, checks the size type of the CCEs. The de-rate matcher 402 determines whether the CQI is greater than a reference CQI, and performs, if the current CQI is greater than the reference CQI, de-rating on the current frame with an increased code rate. Accordingly, the decoder 403 performs decoding on the current subframe at the original code rate or at the de-rated code rate after de-rate matching. The controller 407 determines whether the CCEs in the current subframe are for the mobile station.

The CQI comparator 405 searches the CQI table storage for a CQI of the previous subframe, compares a CQI of the current subframe with the CQI of the previous subframe, and stores the CQI of the current subframe. The previous subframe is the subframe that carried the most recent CQI before the receipt of the current subframe, but not necessarily the subframe immediately before the current subframe. For example, if the current subframe is the fifth subframe and a CQI is not received in the fourth subframe but is received in the third subframe, the third subframe is the previous subframe. If the current subframe is the fifth subframe and CQI is received in the fourth subframe, then the fourth subframe is the previous subframe. The CCE size storage 405 also compares the CQI of the current subframe with the reference CQI and provides the de-rate matcher 402 with the comparison result.

More specifically, the CCE size storage 406 stores information on the size type of the CCEs detected by the CCE controller 401 and provides the size type information to the CQI table storage 404 to update the CQI table.

Figure 5:
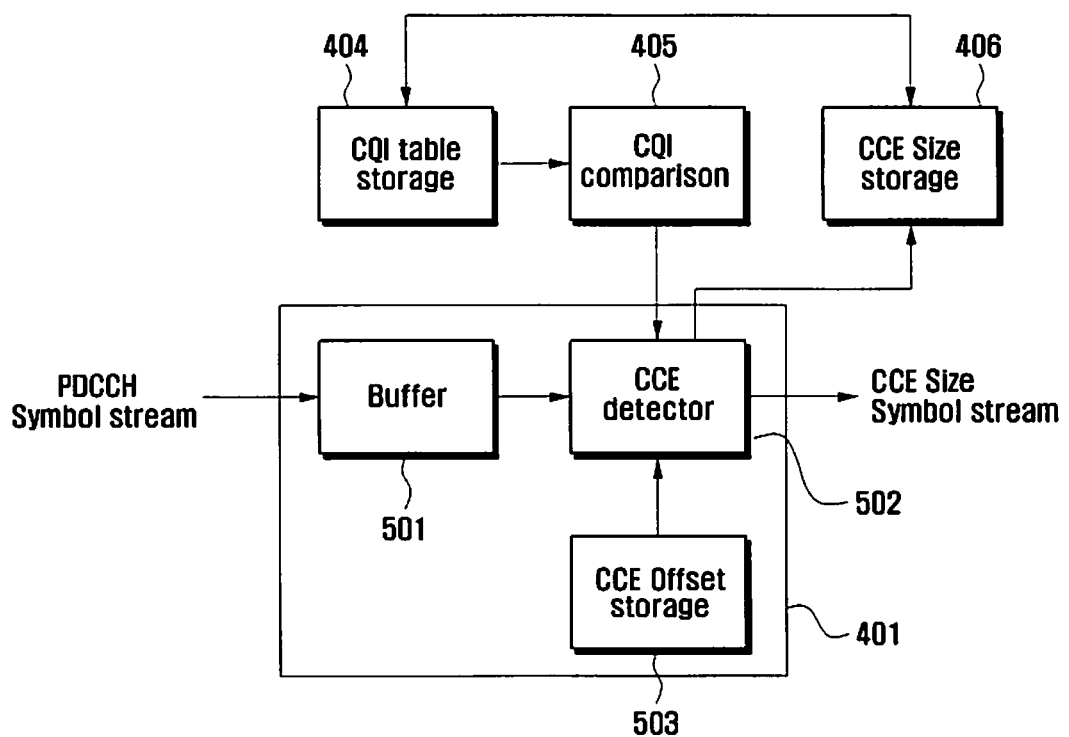
FIG. 5 is a block diagram illustrating a CCE controller of a CCE detection apparatus according to an embodiment of the present invention.

FIG. 5 is a block diagram illustrating a configuration of a CCE controller of a CCE detection apparatus according to an embodiment of the present invention.

Referring to FIG. 5, the CCE controller 401 includes a buffer 501, a CCE detector 502, and a CCE offset storage 503.

The CCE offset storage 503 stores preset offset values for the PDCCH, i.e., the first and last positions of the CCEs in the resource space allocated for the PDCCHs. The CCE detector 502 determines whether the current subframe includes the CCEs arranged based on the size type selected, based on the CQI comparison result provided by the CCE comparator 405, the size type information of the CCEs of the previous subframe provided by the CCE size storage 406, and the offset value provided by the CCE offset storage 503.

Figure 6A:
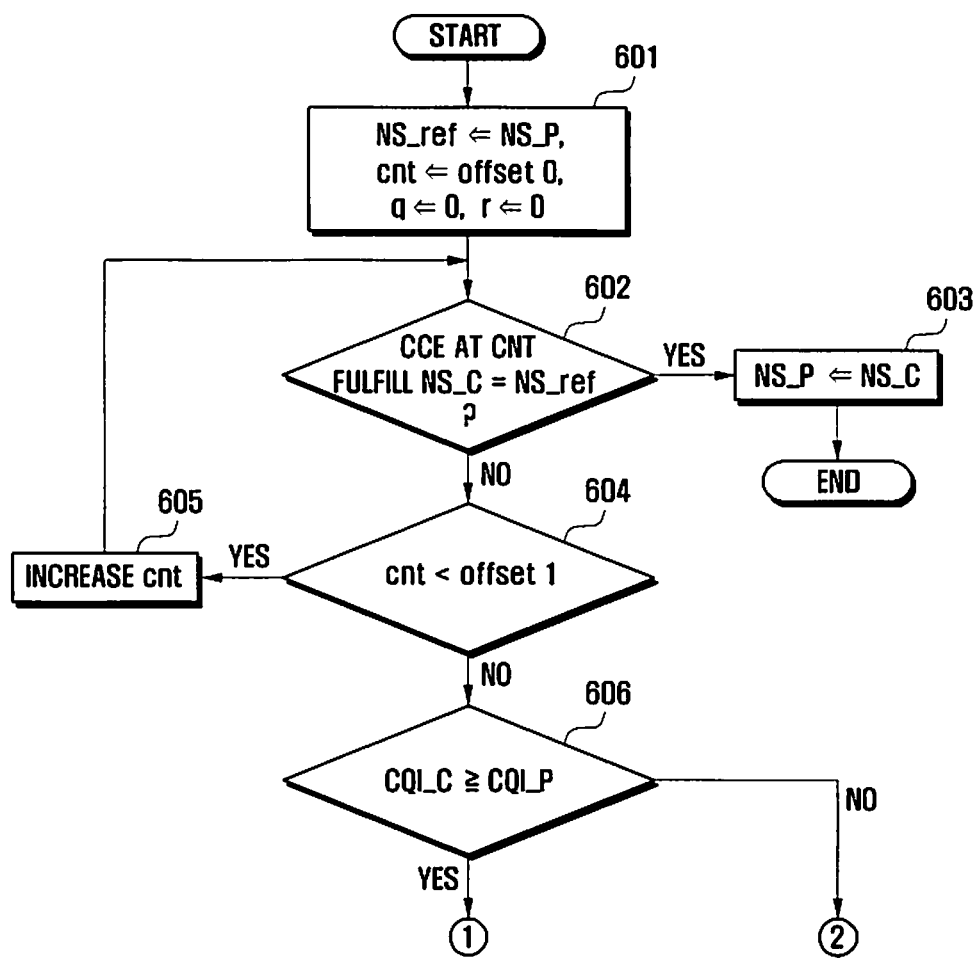
FIGS. 6a to 6c illustrate a procedure for detecting a size type of CCEs according to an embodiment of the present invention.
Figure 6B:
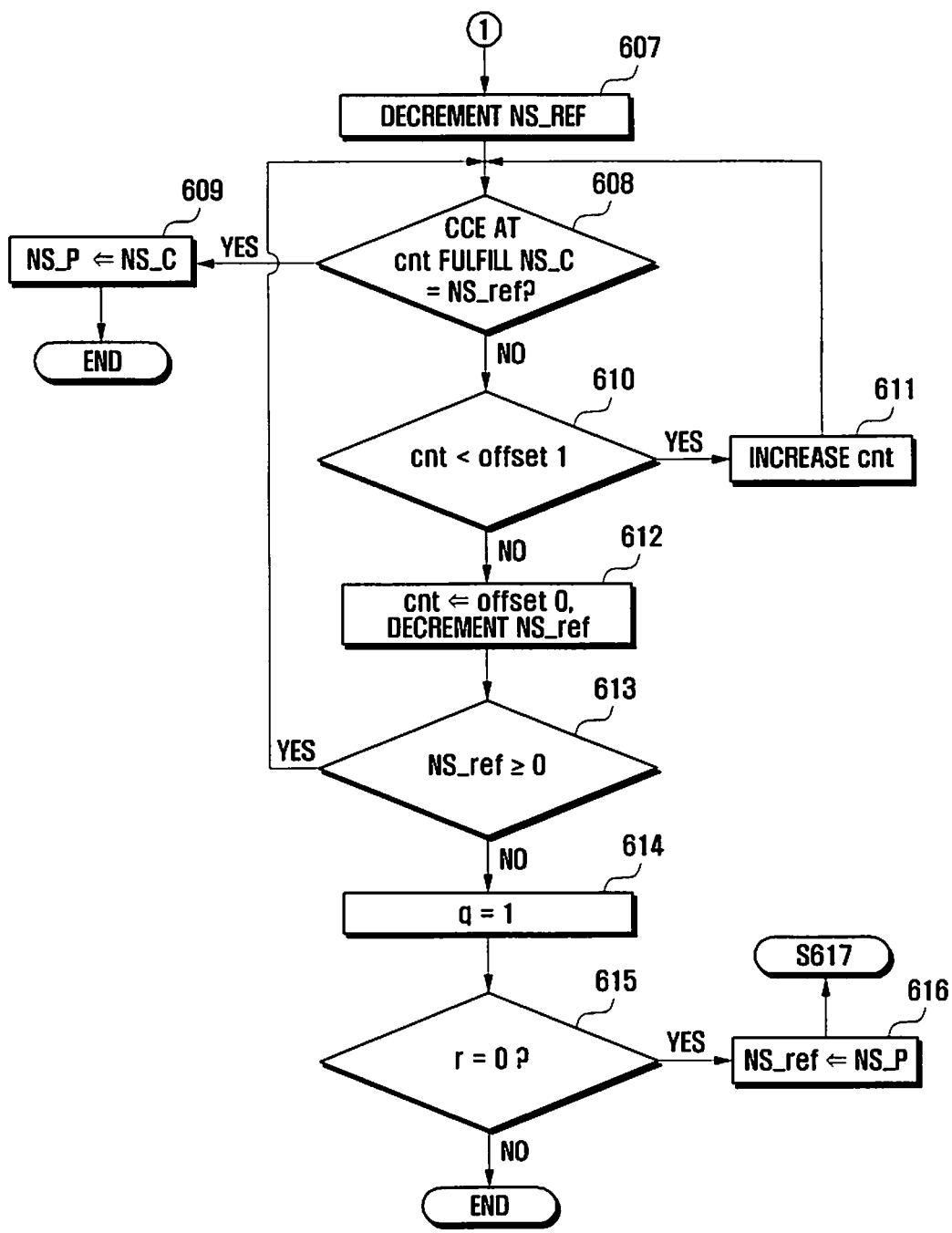
Figure 6C:
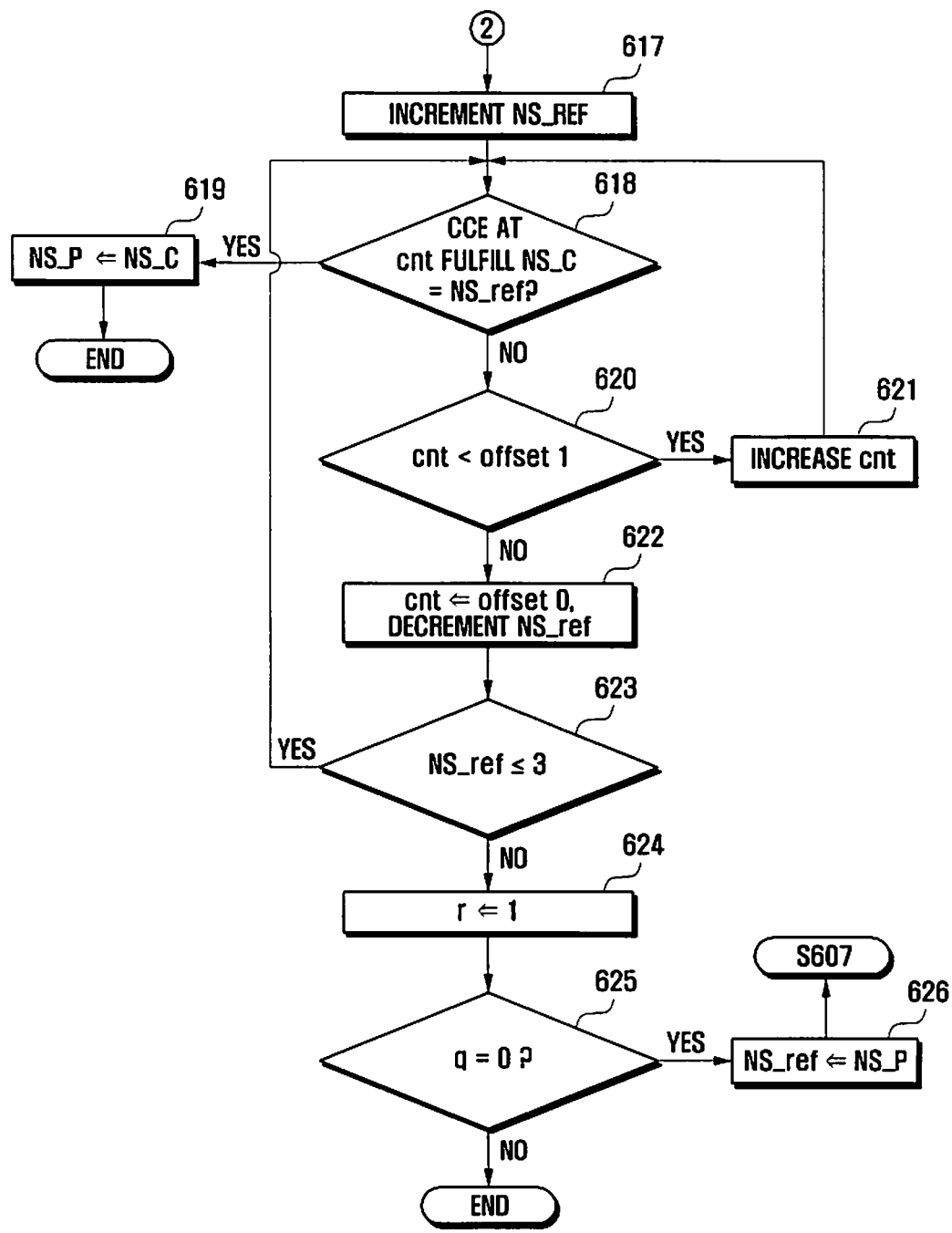

FIGS. 6a to 6c illustrate a procedure for detecting a size type of CCEs according to an embodiment of the present invention. The parameters used in the size type detection procedure illustrated in FIGS. 6a to 6c are described in detail below in Table 1.

TABLE 1

| | |
|---|---|
| CQI_p | CQI of the previous subframe |
| CQI_c | CQI of the current subframe |
| CQI_r0 | First reference CQI |
| CQI_r1 | Second reference CQI |
| NS | Size type (0, 1, 2, and 3) of CCEs |
| NS_P | Size type of CCEs in the previous subframe |
| NS_C | Size type of CCEs in the current subframe |
| NS_ref | Reference size type for CCE search |
| Offset0 | Position where the first CCE is placed in the resource space for PDCCH |
| Offset1 | Position where the last CCE is placed in the resource space for PDCCH |
| cnt | Initial position for search the CCEs |
| q | Variable to determine whether CCE search with a size type less than NS_P is performed |
| r | Variable to determine whether CCE search with a size type greater than NS_P |

Referring to FIGS. 6a to 6c and Table 1, the current subframe CQI (CQI_c) and the previous subframe CQI (CQI_p) are configured first. More specifically, in step 601, the mobile station sets the NS_ref to the NS_P, the cnt to the offset0, which is the first position where the Control Channel Element for the transmission of PDCCHi can be mapped, and q (a variable to determine whether the CCE search with a size type less than NS_P is performed) and r (a variable to determine whether the CCE search with a size type less than NS_ref is performed) to 0.

In step 602, the mobile station determines whether the CCE at the cnt fulfills the size type indicated by the NS_ref and, if it is true, whether the CCE is destined for the mobile station. Step 602 corresponds to the operations of the de-rate matcher 402, the decoder 403, and the controller 407 described with reference to FIG. 4.

If it is determined that the CCE at the cnt fulfills the size type indicated by the NS_ref and destined for the mobile station at step 602, the mobile station sets the NS_P as the NS_C for the next subframe in step 603. This means that the CCE detection procedure for the current subframe ends and a new CCE detection procedure for the next subframe starts.

If it is determined that the CCE at the cnt does not fulfill the size type of NS_ref or is not destined for the mobile station in step 602, the mobile station determines whether the cnt is less than the offset1 in position value in step 604. If it is determined that the cnt is less than the offset1, the mobile station increases the cnt in step 605 and returns to step 602.

However, if it is determined that the cnt is not less than the offset1, the mobile station compares the CQI_c and CQI_p to determine whether the CQI_c is equal to or greater than the CQI_p in step 606. If the CQI_c is equal to or greater than the CQI_p, the procedure goes to step 607 of FIG. 6b and, otherwise, the procedure goes to step 617 of FIG. 6c.

Referring to FIG. 6b, in step 607, the mobile station decrements the NS_ref by one level. In step 608, the mobile station determines whether the CCE at the cnt fulfills the size type indicated by the NS_ref. If the CCE at the cnt fulfills the size type indicated by the NS_ref, the mobile station determines whether the CCE is destined for the mobile station. If it is determined that the CCE at the cnt fulfills the size type indicated by the NS_ref and destined for the mobile station in step 608, the mobile station sets the NS_P as the NS_C for the next subframe in step 609. This means that the CCE detection procedure for the current subframe ends and a new CCE detection procedure for the next subframe starts.

However, if it is determined that the CCE at the cnt does not fulfill the size type of the NS_ref or is not destined for the mobile station in step 608, the mobile station determines whether the cnt is less than the offset1 in position value in step

610. If it is determined that the cnt is less than the offset1, the mobile station increments the cnt in step 611 and the procedure returns to step 608.

If it is determined that the cnt is not less than the offset1 at step 610, the mobile station determines that there is no CCE fulfilling the NS_ref, sets the cnt to the offset0, and decrements the NS_ref by one level in step 612.

In step 613, the mobile station determines whether the decremented NS_ref is equal to or greater than 0. If the NS_ref is not equal to or greater than 0 (there is no level less than 0), the mobile station sets the q to 1 in step 614. Here, q is a variable to check whether the CCE search with a size type less than NS_P has been performed. If the CCE search with a size type less than NS_P has not been performed, q is 0 as configured at step 601. Once the q is checked, it is reset to 1.

In step 615, the mobile station determines whether the r is equal to 0. Here, r is a variable to determine whether a CCE search with a size type greater than NS_P has been performed. If r is 0 at step 615, the CCE search with the size type greater than the NS_P has not been performed. In this case, the mobile station sets the NS_ref with the NS_P in step 616, and the procedure goes to step 617 in FIG. 6c.

However, if q is not 0 (i.e., q is 1) in step 615, there is no CCE destined for the mobile station.

Referring to FIG. 6c, in step 617, the mobile station increments the NS_ref by one level. In step 618, the mobile station determines whether the CCE at the cnt fulfills the size type indicated by the NS_ref and, if so, whether the CCE is destined for the mobile station. If it is determined that the CCE at the cnt fulfills the size type indicated by the NS_ref and destined for the mobile station in step 618, the mobile station sets the NS_P as the NS_C for the next subframe in step 619, thereby ending the CCE detection for the current subframe and starting a new CCE detection procedure for a next frame.

If it is determined that the CCE at the cnt does not fulfill the size of the NS_ref or is not destined for the mobile station in step 618, the mobile station determines whether the cnt is less than the offset1 in position value in step 620. If it is determined that the cnt is less than the offset1, the mobile station increments the cnt in step 621 and the procedure returns to step 618.

If it is determined that the cnt is not less than the offset1 in step 620, the mobile station determines that there is no CCE fulfilling the NS_ref, and sets the cnt to the offset0 and increments the NS_ref by one level in step 622.

In step 623, the mobile station determines whether the incremented NS_ref is equal to or less than 3. If the NS_ref is not equal to or less than 3 (there is no level greater than 4), the mobile station sets the r to 1 in step 624. Here, r is a variable to check whether the CCE search with a size type greater than NS_P has been performed. If the CCE search with a size type has not been performed, the r is 0 as configured in step 601. Once the r is checked, it is reset to 1.

In step 625, the mobile station determines whether q is equal to 0. Here, to q is a variable to determine whether a CCE search with a size type less than NS_P has been performed. If q is 0 in step 625, the CCE search with the size type less than the NS_P has not been performed. In this case, the mobile station sets the NS_ref with the NS_P in step 626, and the procedure goes to Step 607 in FIG. 6b. If q is not 0 (i.e., q is 1) in step 625, there is no CCE destined for the mobile station.

Figure 7:
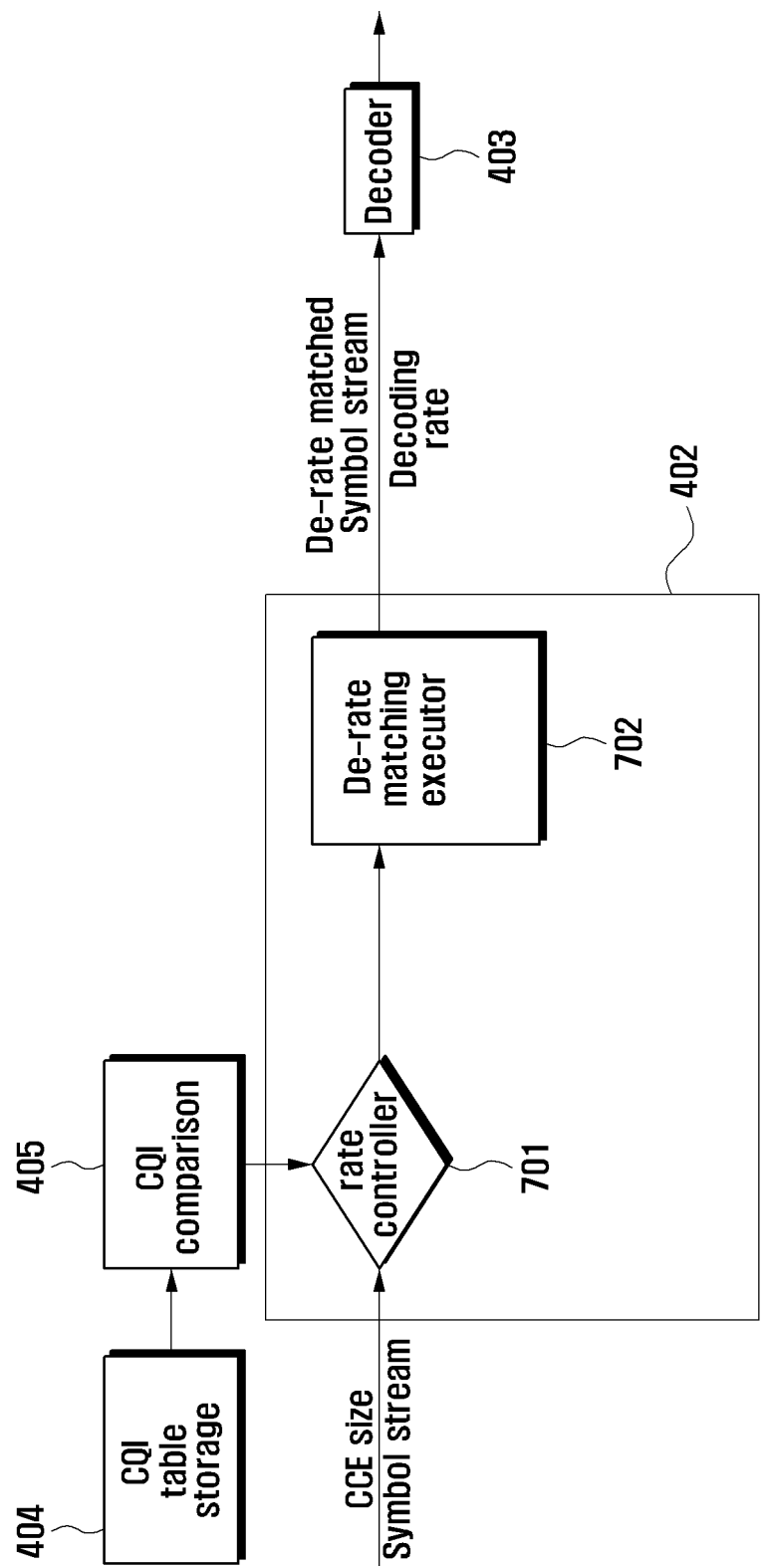
FIG. 7 is a block diagram illustrating a de-rate matcher of a CCE detection apparatus according to an embodiment of the present invention.

FIG. 7 is a block diagram illustrating a configuration of a de-rate matcher of a CCE detection apparatus according to an embodiment of the present invention.

As illustrated in FIG. 7, the de-rate matcher 402 includes a code rate controller 701 and a de-rate matching executor 702.

The CQI comparator 405 determines whether the CQI of the current subframe is greater than the first reference CQI (CQI_r0) and the second reference CQI (CQI_r1).

If it is determined that the CQI of the current subframe is greater than the first reference CQI (CQI_r0) and equal to or less than the second reference CQI (CQI_r1), the rate controller 701 controls the de-rate matching executor 702 to performs de-rate matching on the current subframe using the CCEs encoded at the code rate that are equal to that of the mother code. Otherwise, if the CQI of the current subframe is greater than both the first reference CQI (CQI_r0) and second reference CQI (CQI_r1), the rate controller 701 controls the de-rate matching executor 702 to perform de-rate matching on the current subframe using the CCEs encoded at the code rate that are greater than that of the mother code.

For example, for ⅓ code rate iterative code de-rate matching, if the CQI of the current subframe is greater than the first reference CQI (CQI_r0) and equal to or less than the second reference CQI (CQI_r1), the rate controller 701 controls the de-rate matching executor 702 to perform the de-rate matching on the current frame using the CCEs encoded at the ⅓ code rate of the iterative code, which is the code rate of the mother code. If the CQI of the current subframe is greater than both the first reference CQI (CQI_r0) and the second reference CQI (CQI_r1), the rate controller 701 controls the de-rate matching executor 702 to perform the de-rate matching on the current frame using the CCEs encoded at the ½ code rate of the iterative code. However, it is noted to those skilled in the art that the concept of the first and second reference CQIs used in the embodiments of the present invention can be the values derived through a simulation.

As described above, the CCE detection method and apparatus in accordance with the embodiments of the present invention are capable of reducing the PDCCH detection time, resulting in reduction of power consumption of the mobile station.

Although certain embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A Control Channel Element (CCE) detection method of a mobile station using a Channel Quality Indicator (CQI) in a wireless communication system, comprising:

searching a current subframe for CCEs; and locating the CCEs carrying control information for the mobile station by decoding the current subframe, wherein searching the current subframe for the CCEs comprises searching the subframe for the CCEs carrying the control information for the mobile station while changing a searching order for an aggregation level using a size type of the CCEs according to a result of a comparison between a current CQI and a previous CQI, and wherein the size type is indicative of a number of CCEs used for transmitting a Physical Downlink Control Channel (PDCCH), wherein locating the CCEs further comprises determining whether the current subframe includes a scheduling grant for the mobile station, and wherein searching the current subframe for the CCEs comprises:

comparing the CQI of the current frame with the previous CQI;

searching, when the current CQI is greater than the previous CQI, for CCEs with a size type less than a size type of CCEs of the previous subframe in the current subframe; and searching, when the current CQI is equal to or less than the previous CQI, for CCEs with a size type greater than the size type of the CCEs of the previous subframe in the current subframe.

2. The CCE detection method of claim 1, wherein locating the CCEs comprises de-rating the current subframe while changing a code rate of the CCEs according to a value of a CQI of the current subframe.

3. The CCE detection method of claim 2, wherein locating the CCEs comprises:

de-rate matching, when the current CQI is greater than a first reference CQI being a value with which decoding can be performed correctly by using only the CCEs corresponding to a code rate of a mother code in de-rate matching and is equal to or less than a second reference CQI being a value with which decoding can be performed correctly by using the CCEs corresponding to a code rate higher than that of the mother code in de-rate matching, the current subframe using the CCEs coded at the code rate of the mother code; and de-rate matching, when the current CQI is greater than both the first and second reference CQIs, the current subframe using the CCEs coded at a code rate greater than the code rate of the mother code.

4. A Control Channel Element (CCE) detection apparatus of a mobile station, comprising:

a CCE controller arranged for searching a current subframe for CCEs;

a decoder arranged for decoding the current subframe, when the CCEs are found;

a determiner arranged for determining whether the CCEs carried by the subframe are transmitted for the mobile terminal, based on a result of decoding the current subframe; and a CQI comparator that compares a current Channel Quality Indicator (CQI) with a previous CQI, wherein the CCE controller is arranged for decoding the subframe for the CCEs by changing a searching order for an aggregation level_using a size type of the CCEs according to a result of a comparison between the current CQI and the previous CQI, wherein the size type is indicative of a number of CCEs used for transmitting a Physical Downlink Control Channel (PDCCH), wherein the determiner determines whether the current subframe includes a scheduling grant for the mobile station, and wherein the CCE controller begins searching CCEs with a size type less than a size type of CCEs of the previous subframe in the current subframe, when current CQI is greater than the previous CQI, and begins searching CCEs with a size type greater than the size type of the CCEs of the previous subframe in the current subframe, when the current CQI is equal to or less than the previous CQI.

5. The CCE detection apparatus of claim 4, wherein the determiner is arranged for de-rating the current frame while changing a code rate of the CCEs according to a value of the CQI of the current subframe.

6. The CCE detection apparatus of claim 5, wherein the decoder performs de-rate matching on the current subframe using the CCEs decoded at a code rate of a mother code, when the current CQI is greater than a first reference CQI being a value with which decoding can be performed correctly by using only the CCEs corresponding to the code rate of the mother code in de-rate matching and is equal to or less than a second reference CQI being a value with which decoding can be performed correctly by using the CCEs corresponding to a code rate higher than that of the mother code in de-rate matching, and performs de-rate matching on the current subframe using the CCEs decoded at a code rate greater than the code rate of the mother code, when the current CQI is greater than both the first and second reference CQIs.

* * * * *